(12) United States Patent
Lin et al.

(10) Patent No.: US 11,640,052 B2
(45) Date of Patent: May 2, 2023

(54) LIGHT PATH ADJUSTMENT MECHANISM

(71) Applicant: Young Optics Inc., Hsinchu (TW)

(72) Inventors: Wei-Szu Lin, Hsinchu (TW);
Chih-Chien Lin, Hsinchu (TW);
Yu-Chen Chang, Hsinchu (TW);
Kuan-Lun Cheng, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 262 days.

(21) Appl. No.: 17/184,016

(22) Filed: Feb. 24, 2021

(65) Prior Publication Data
US 2021/0271071 A1    Sep. 2, 2021

(30) Foreign Application Priority Data

Feb. 27, 2020    (TW) ................. 10910655.2

(51) Int. Cl.
*G02B 26/08*    (2006.01)

(52) U.S. Cl.
CPC .......... *G02B 26/08* (2013.01); *G02B 26/085* (2013.01); *G02B 26/0816* (2013.01); *G02B 26/0833* (2013.01); *G02B 26/0875* (2013.01)

(58) Field of Classification Search
CPC ............... G02B 26/08; G02B 26/0816; G02B 26/0833; G02B 26/085; G02B 26/0875
See application file for complete search history.

(56) References Cited

U.S. PATENT DOCUMENTS

| 8,016,429 B2 | 9/2011 | Chang et al. |
| 2008/0078262 A1 | 4/2008 | Murata et al. |
| 2014/0111839 A1* | 4/2014 | Suzuki ............... G02B 26/0833 359/198.1 |
| 2019/0346684 A1* | 11/2019 | Chou ................. G02B 27/0977 |

FOREIGN PATENT DOCUMENTS

| CN | 105807385 A | 7/2016 |
| TW | 201947311 A | 12/2019 |
| WO | WO-2016124782 A1 | 8/2016 |

OTHER PUBLICATIONS

Office Action issued in corresponding TW application No. 109106552 dated Feb. 5, 2021.

\* cited by examiner

*Primary Examiner* — Cara E Rakowski
(74) *Attorney, Agent, or Firm* — Muncy, Geissler, Olds & Lowe, P.C.

(57) ABSTRACT

A light path adjustment mechanism includes a carrier, an optical plate member, a support, a base, a first pair of transmission mechanical pieces, and a second pair of transmission mechanical pieces. One side of the support is provided with a first actuator, and one side of the base is provided with a second actuator. The first pair of transmission mechanical pieces are connected between the base and the support, and the second pair of transmission mechanical pieces are connected between the carrier and the support. The first pair of transmission mechanical pieces are entirely disposed on only one side of the carrier.

20 Claims, 5 Drawing Sheets

LIGHT PATH ADJUSTMENT MECHANISM

BACKGROUND OF THE INVENTION a. Field of the Invention

The invention relates generally to an optical mechanism, and more particularly to a light path adjustment mechanism.

b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a carrier, an optical plate member, a support, a base, a first pair of transmission mechanical pieces, and a second pair of transmission mechanical pieces. The optical plate member is disposed on the carrier, the support is disposed adjacent to the carrier, and one side of the support is provided with a first actuator. The base is disposed adjacent to the support, and one side of the base is provided with a second actuator. The first pair of transmission mechanical pieces are connected between the base and the support and define a first direction, and the second pair of transmission mechanical pieces are connected between the carrier and the support and define a second direction. The first pair of transmission mechanical pieces are entirely disposed on only one side of the carrier, and the first direction is different to the second direction.

According to another aspect of the present disclosure, a light path adjustment mechanism includes a mount, a frame, a carrier, a first actuator, and a second actuator. The frame is connected with the mount by a first pair of flexible members to define a first axis, the carrier is connected with the frame by a second pair of flexible members to define a second axis, and the carrier is provided with an optical plate member. The first actuator is disposed on one side of the first axis, and a second actuator is disposed on one side of the second axis. The light path adjustment mechanism has only two actuators that are the first actuator and the second actuator, and a line segment connected between two opposite end points of the first pair of flexible members does not cross a line segment connected between two opposite end points of the second pair of flexible members.

According to the above aspects, because the first pair of flexible members and the actuators are all disposed on the same side of the optical plate member, a length measured in the axis direction of the second pair of flexible members can be reduced. For example, in case the light path adjustment mechanism is installed in an optical module such as a projector, and the second pair of flexible members are arranged to orient in a vertical direction, reducing the length along the axis direction of the second pair of flexible members can decrease the height of the overall optical module and hence make the optical module more thinner.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance perceived image resolution, improve picture quality (e.g., eliminating dark regions or blurring image edges), or provide other beneficial effects. Further, it should be understood that the light path adjustment mechanism is not limited to a specific arrangement and location in the optical system.

Figure 1B:
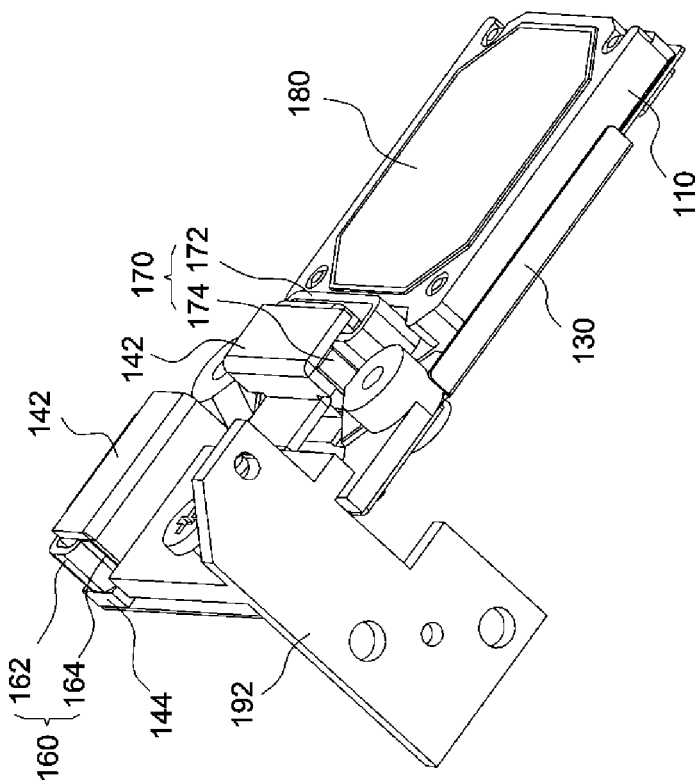
FIGS. 1A and 1B show three-dimensional diagrams of a light path adjustment mechanism under different viewing directions according to an embodiment of the invention.
Figure 1A:
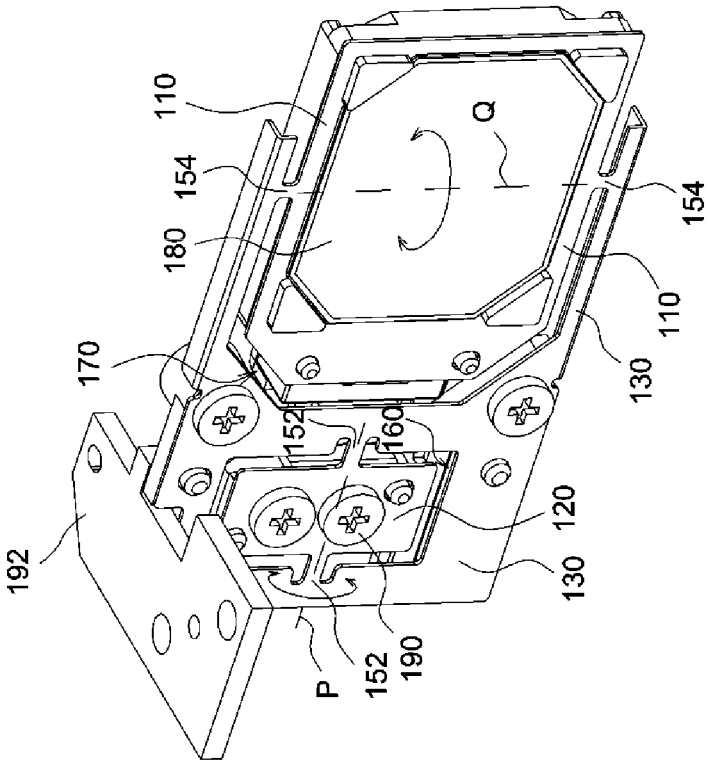

FIGS. 1A and 1B show three-dimensional diagrams of a light path adjustment mechanism under different viewing directions according to an embodiment of the invention. With reference to FIG. 1, a light path adjustment mechanism 100 includes a carrier 110, a base 120, a support 130, a first pair of flexible members 152, and a second pair of flexible members 154.

In this embodiment, the support 130 is disposed adjacent to and outside the base 120, the first pair of flexible members 152 is connected between the base 120 and the support 130 and defines a first direction (extending direction of a first axis P), the support 130 is disposed adjacent to and outside the carrier 110, the second pair of flexible members 154 is connected between the carrier 110 and the support 130 and defines a second direction (extending direction of a second axis Q), and the first direction is different to the second direction. For example, the first direction is substantially perpendicular to the second direction as shown in FIG. 1A, but the invention is not limited thereto. In this embodiment, the base 120 is connected to and fixed on a bracket 192 through fasteners 190 such as screws or pins, and the carrier 110, the base 120, the support 130, the first pair of flexible members 152 and the second pair of flexible members 154 are located at substantially the same height and formed from the same flexible sheet, but the invention is not limited thereto. Further, the light path adjustment mechanism 100 may include an optical plate member 180. The optical plate member 180 may be disposed on the carrier 110. The optical plate member 180 is not limited to a specific form or structure, so long as it may change, at least to some extent, the traveling direction of incoming light beams. For example, the optical plate member 180 may be a lens or a mirror. As shown in FIG. 1B, the light path adjustment mechanism 100 may further include an actuator 160 and an actuator 170 disposed on the back of the light path adjustment mechanism 100. In this embodiment, the actuator 160 is disposed on one side of the base 120 and may include a coil 162 and a magnet 164, and the actuator 170 is disposed on one side of the support 130 and may include a coil 172 and a magnet 174. The magnets 164 and 174 may be fixed on a magnet seat 142, the coil 162 may be disposed on a coil seat 144, and the coil 172 may be disposed on the optical plate member 180. Referring to FIG. 1A again, the actuator 160 is energized to generate attractive or repulsive forces that cause the optical plate member 180 and the support 130 to reciprocally rotate or tilt about the first axis P defined by the first pair of flexible members 152, and the actuator 170 is energized to generate attractive or repulsive forces that cause the optical plate member 180 and the carrier 110 to reciprocally rotate or tilt about the second axis Q defined by the second pair of flexible members 154. Because the first pair of flexible members 152 and the second pair of flexible members 154 may serve as rotation axes to transmit the power that tilts the optical plate member 180, each of the first pair of flexible members 152 and the second pair of flexible members 154 may be referred to as a transmission mechanical piece.

Figure 2:
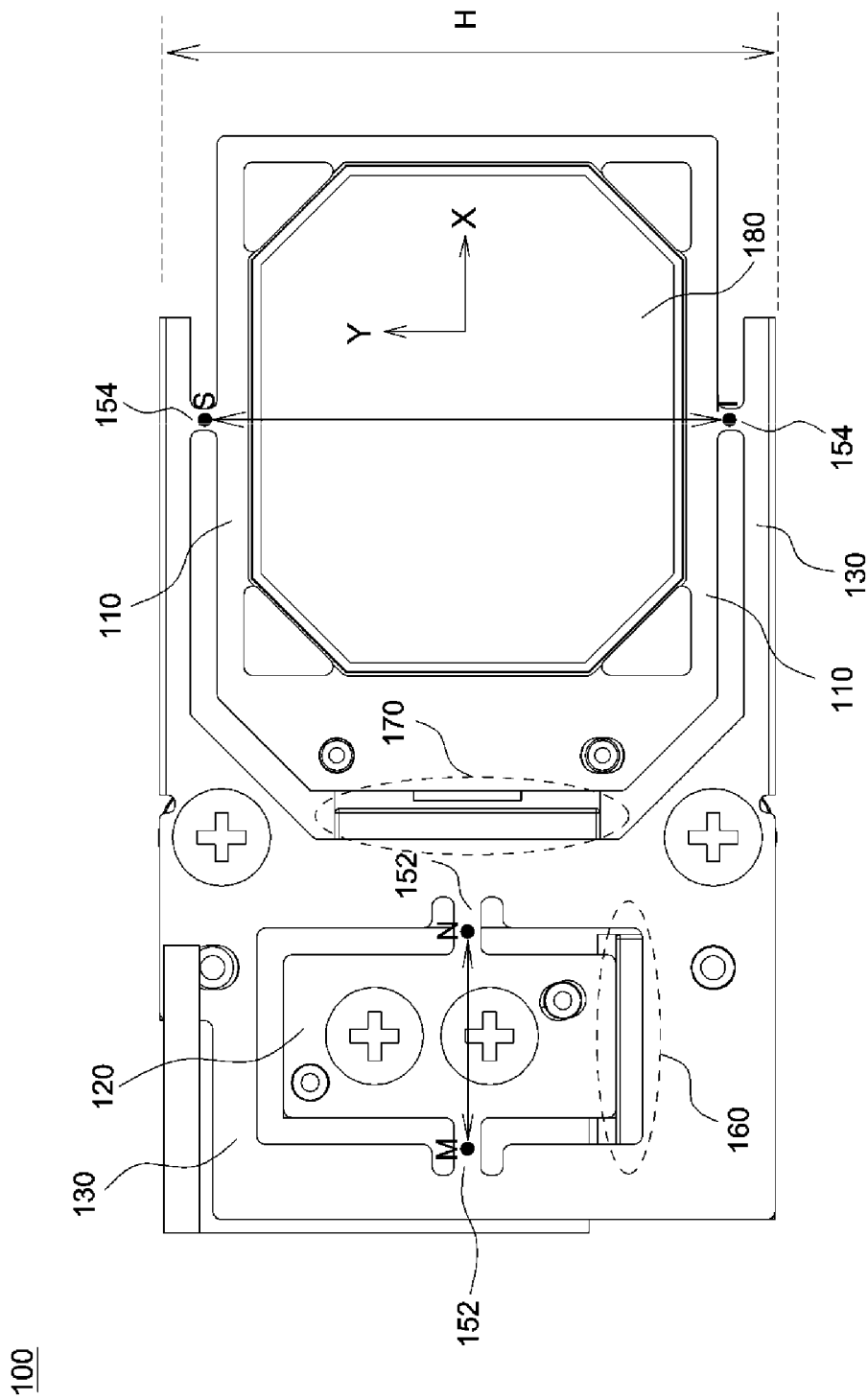
FIG. 2 shows a schematic plan view of a light path adjustment mechanism according to an embodiment of the invention.

As shown in FIG. 2, the first pair of flexible members 152 connected between the base 120 and the support 130 are parallel to, for example, an X-axis direction, and the second pair of flexible members 154 connected between the carrier 110 and support 130 are parallel to, for example, a Y-axis direction. The actuator 160 is energized to generate attractive or repulsive forces that act on the support 130 and cause the optical plate member 180 and the support 130 to reciprocally rotate or tilt about the first pair of flexible members 152 (X-axis direction). Similarly, the actuator 170 is energized to generate attractive or repulsive forces that act on one end of the carrier 110 and cause the optical plate member 180 and the carrier 110 to reciprocally rotate or tilt about the second pair of flexible members 154 (Y-axis direction). Therefore, the optical plate member 180 may tilt or rotate about two different axes to reach various positions within an angular range to reflect or refract incoming light beams, which may cause a change in the traveling direction and propagation path of incoming light beams. In one embodiment, an image beam that intends to impinge upon the optical plate member 180 is deflected by the optical plate member 180 that rapidly and alternately tilts among four different positions relative to the base 120 to form four different pixel images, thereby increasing the perceived image resolution at least by four times. According to the above embodiments, the light path adjustment mechanism may modify or change light paths to enhance image resolution, improve picture quality (e.g., eliminating dark regions or blurring image edges), or provide other beneficial effects.

Referring to FIG. 2 again, in this embodiment, all the actuators 160 and 170 are disposed on the same side (such as the left side shown in FIG. 2) of the optical plate member 180 (or the carrier 110), the first pair of flexible members 152 are entirely disposed on only one side of the optical plate member 180 (or the carrier 110), and the second pair of flexible members 154 are respectively disposed on two opposite sides of the carrier 110, but the invention is not limited thereto. Further, in this embodiment, only one side of two opposite sides of the axis defined by the first pair of flexible members 152 is provided with an actuator (the actuator 160), and only one side of two opposite sides of the axis defined by the second pair of flexible members 154 is provided with an actuator (the actuator 170). In this embodiment, as shown in FIG. 2, a line segment connected between two opposite end points M and N of the first pair of flexible members 152 does not cross a line segment connected between two opposite end points S and T of the second pair of flexible members 154, but the invention is not limited thereto.

According to the above embodiment, the first pair of flexible members 152, the actuator 160 and the actuator 170 are all disposed on the same side of the optical plate member to reduce a length measured in one direction, such as the length H measured in the axis direction of the second pair of flexible members 154 shown in FIG. 2. For example, in case the light path adjustment mechanism 100 is installed in an optical module such as a projector, and the second pair of flexible members 154 are arranged to orient in a vertical direction, reducing the length H measured in the direction of the second pair of flexible members 154 can decrease the height of the overall optical module and hence make the optical module more thinner. In one embodiment, the length H of the light path adjustment mechanism measured in the axis direction of the second pair of flexible members 154 is smaller than 14 mm.

Figure 3:
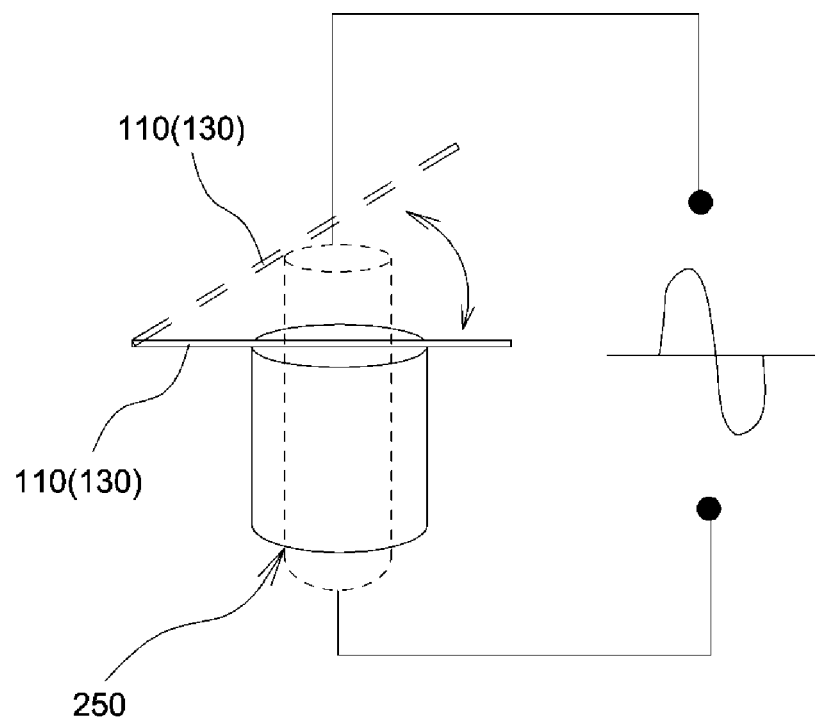
FIG. 3 shows a schematic diagram of an actuator according to another embodiment of the invention.

In various embodiments of the invention, the structure and operation of the actuator are not limited to a specific manner, as long as an action force for titling or rotating the optical plate member can be provided. For example, in one embodiment, the carrier 110 and the support 130 may be formed from a magnetic material, and the actuator may include an air core coil or an electromagnet. When the air core coil or the electromagnet is energized, an attractive force is generated to attract the carrier 110, which causes one end of the optical plate member 180 to move downwardly to allow the optical plate member 180 to tilt. Moreover, in other embodiment, each of the two sides of the first pair of flexible members 152/second pair of flexible members 154 may be provided with an actuator to enhance the vibration degree of the optical plate member 180. In other embodiment, as shown in FIG. 3, the actuator may include a piezoelectric element 250 disposed on the carrier 110 or the support 130. The piezoelectric element 250 may deform and change in shape when an electric field is applied, converting electrical energy into mechanical energy, to cause reciprocate movement of the optical plate member 180. Further, the components of the light path adjustment mechanism 100 described in the above embodiments are merely for exemplified purposes and can be replaced with other elements having the same or similar functions. For example, the support 130 may be replaced with a frame, and the base 120 may be replaced with a mount. In one embodiment, a gap between the magnet 164 and the coil 162 is smaller than 1 mm, and a gap between the magnet 174 and the coil 172 is smaller than 1 mm.

In one embodiment, the carrier 110, the base 120, the support 130, the magnet seat 142, the coil seat 144, the first pair of flexible members 152 and the second pair of flexible members 154 may be all integrally formed as one piece using the same material. Alternatively, two or more than two of them may be integrally formed as one piece and are then combined with the remainder. Further, in one embodiment, the bracket 140 may be provided with a structure for storing magnets to thus omit the magnet seat 142.

Figure 4:
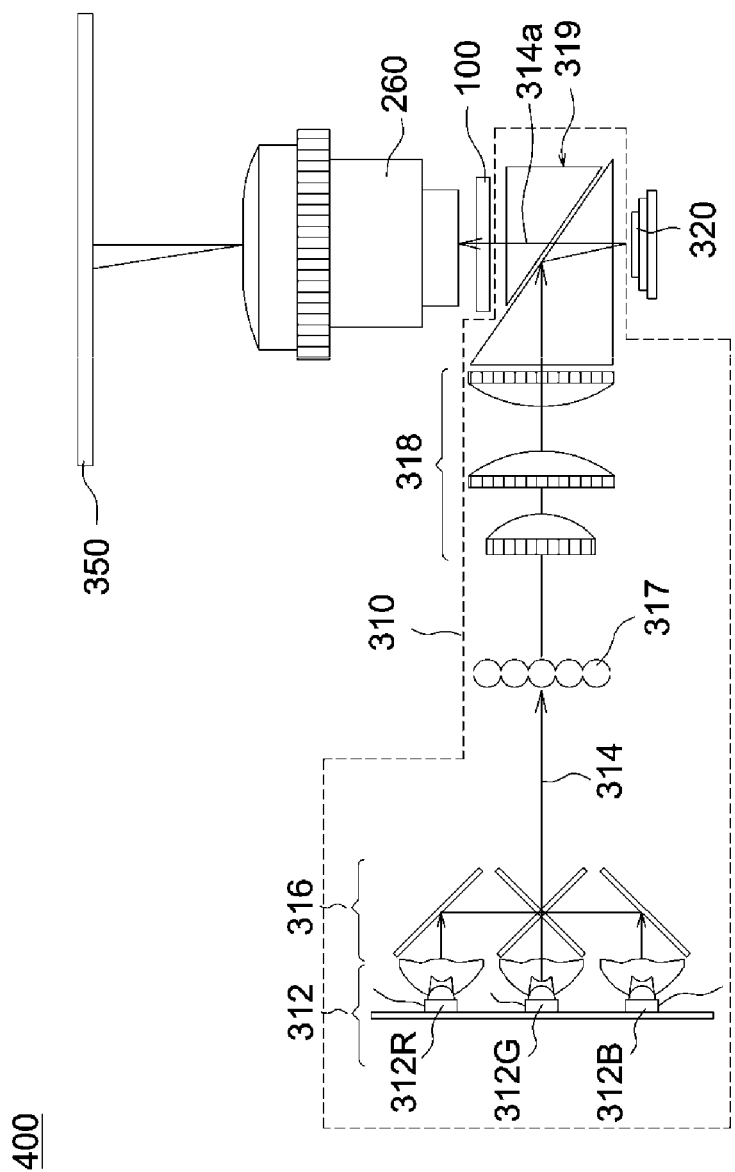
FIG. 4 shows a schematic diagram of a light path adjustment mechanism used in a projector according to an embodiment of the invention.
Figure 5:
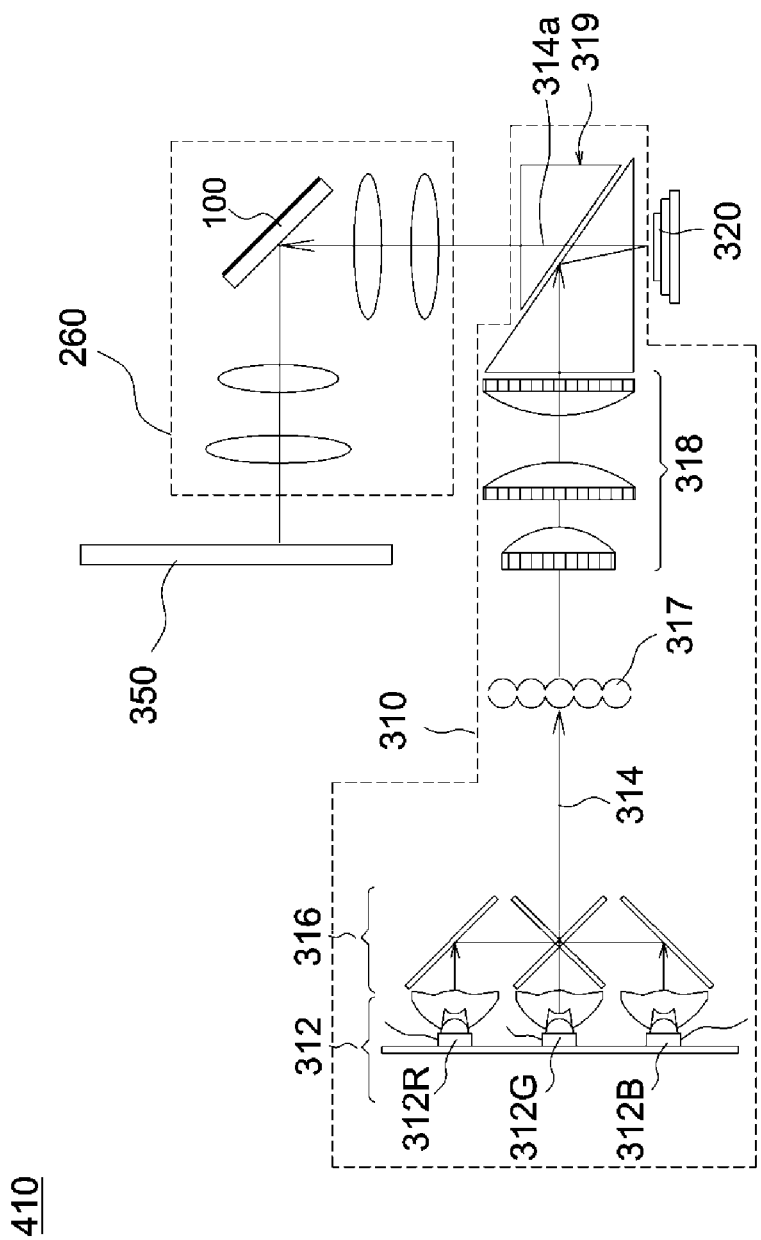
FIG. 5 shows a schematic diagram of a light path adjustment mechanism used in a projector according to another embodiment of the invention.

FIG. 4 shows a schematic diagram of a light path adjustment mechanism used in a projector according to an embodiment of the invention. Referring to FIG. 4, a projector 400 includes an illumination system 310, a light valve 320, a projection lens 260 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 260 is disposed in a propagation path of the sub images 314a, and the light valve 320 is disposed between the illumination system 310 and the projection lens 260. Further, the light path adjustment mechanism 100 may be disposed between the light valve 320 and the projection lens 260 or in the projection lens 260. For example, the light path adjustment mechanism 100 may be disposed between the light valve 320 and a TIR prism 319 or between the TIR prism 319 and the projection lens 260. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and are projected on a screen 350 by the projection lens 260. In this embodiment, when the sub images 314a reach the light path adjustment mechanism 100, the light path adjustment mechanism 100 may reflect the sub images 314a and alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal direction and/or a vertical direction. In this embodiment, the light path adjustment mechanism 100 is allowed to horizontally and/or vertically shift the position of the sub images 314a for a distance to therefore improve horizontally and/or vertically image resolutions. Although the light path adjustment mechanism is described herein as being applied to the projector 400, in other embodiments, the light path adjustment mechanism can be applied to different optical systems to achieve different effects without limitation. Besides, the arrangement and position of the light path adjustment mechanism in an optical system are not restricted. For example, in other embodiment, the light path adjustment mechanism 100 may be disposed in the projection lens 260 of an optical device 410 as shown in FIG. 5.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

A projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A light path adjustment mechanism, comprising:
   a carrier;
   an optical plate member disposed on the carrier;
   a support disposed adjacent to the carrier, and one side of the support being provided with a first actuator;
   a base disposed adjacent to the support, and one side of the base being provided with a second actuator;
   a first pair of transmission mechanical pieces connected between the base and the support and defining a first direction; and
   a second pair of transmission mechanical pieces connected between the carrier and the support and defining a second direction, wherein the first pair of transmission mechanical pieces are entirely disposed on only one side of the carrier, and the first direction is different to the second direction.

2. The light path adjustment mechanism as claimed in claim 1, wherein the first actuator and the second actuator are disposed on a same side of the optical plate member.

3. The light path adjustment mechanism as claimed in claim 1, wherein the optical plate member is a lens or a mirror.

4. The light path adjustment mechanism as claimed in claim 1, wherein each of the first actuator and the second actuator includes a magnet and a coil.

5. The light path adjustment mechanism as claimed in claim 4, wherein a gap between the magnet and the coil is smaller than 1 mm.

6. The light path adjustment mechanism as claimed in claim 1, wherein the support is disposed outside the carrier and the base.

7. The light path adjustment mechanism as claimed in claim 1, wherein the carrier, the base, the support, the first pair of transmission mechanical pieces and the second pair of transmission mechanical pieces are integrally formed as one piece.

8. The light path adjustment mechanism as claimed in claim 1, wherein the carrier, the base, the support, the first pair of transmission mechanical pieces and the second pair of transmission mechanical pieces are located at substantially the same height.

9. The light path adjustment mechanism as claimed in claim 1, wherein a length of the light path adjustment mechanism measured in the second direction of the second transmission mechanical pieces is smaller than 14 mm.

10. The light path adjustment mechanism as claimed in claim 1, wherein the carrier and the support are formed from a magnetic material.

11. A light path adjustment mechanism, comprising:
a mount;
a frame being connected with the mount by a first pair of flexible members to define a first axis;
a carrier being connected with the frame by a second pair of flexible members to define a second axis, and the carrier being provided with an optical plate member;
a first actuator disposed on one side of the first axis; and
a second actuator disposed on one side of the second axis, wherein the light path adjustment mechanism has only two actuators that are the first actuator and the second actuator, and a line segment connected between two opposite end points of the first pair of flexible members does not cross a line segment connected between two opposite end points of the second pair of flexible members.

12. The light path adjustment mechanism as claimed in claim 11, wherein the first actuator and the second actuator are disposed on a same side of the optical plate member.

13. The light path adjustment mechanism as claimed in claim 11, wherein the optical plate member is a lens or a mirror.

14. The light path adjustment mechanism as claimed in claim 11, wherein each of the first actuator and the second actuator includes a magnet and a coil.

15. The light path adjustment mechanism as claimed in claim 14, wherein a gap between the magnet and the coil is smaller than 1 mm.

16. The light path adjustment mechanism as claimed in claim 11, wherein the frame is disposed outside the carrier and the mount.

17. The light path adjustment mechanism as claimed in claim 11, wherein the carrier, the mount, the frame, the first pair of flexible members and the second pair of flexible members are integrally formed as one piece.

18. The light path adjustment mechanism as claimed in claim 11, wherein the carrier, the mount, the frame, the first pair of flexible members and the second pair of flexible members are located at substantially the same height.

19. The light path adjustment mechanism as claimed in claim 11, wherein a length of the light path adjustment mechanism measured in a direction parallel to the second axis of the second flexible members is smaller than 14 mm.

20. The light path adjustment mechanism as claimed in claim 11, wherein the carrier and the frame are formed from a magnetic material.

* * * * *